(12) United States Patent
Mertler et al.

(10) Patent No.: US 8,573,519 B2
(45) Date of Patent: Nov. 5, 2013

(54) PROCESS FOR PRODUCING NANOSCALE ORGANIC SOLID PARTICLES

(75) Inventors: Michael Mertler, Freinsheim (DE); Bernd Sachweh, Meckenheim (DE); Markus Linsenbuehler, Ludwigshafen (DE); Jörg Halpap, Mannheim (DE); Siegfried Ripperger, Gonbach (DE); Tino Voigt, Kaiserslautern (DE); Kai Nikolaus, Homburg (DE)

(73) Assignee: BASF SE, Ludwigshafen (DE)

( * ) Notice: Subject to any disclaimer, the term of this patent is extended or adjusted under 35 U.S.C. 154(b) by 424 days.

(21) Appl. No.: 13/059,046

(22) PCT Filed: Aug. 11, 2009

(86) PCT No.: PCT/EP2009/060354
§ 371 (c)(1),
(2), (4) Date: Mar. 11, 2011

(87) PCT Pub. No.: WO2010/018155
PCT Pub. Date: Feb. 18, 2010

(65) Prior Publication Data
US 2011/0163191 A1    Jul. 7, 2011

(30) Foreign Application Priority Data
Aug. 15, 2008    (EP) .................................. 08162455

(51) Int. Cl.
B02C 19/06    (2006.01)
(52) U.S. Cl.
CPC ...................................... B02C 19/06 (2013.01)
USPC .................................................. 241/5; 241/23
(58) Field of Classification Search
CPC ........................................................ B02C 19/06
USPC ............................................ 241/1, 5, 23, 39
See application file for complete search history.

(56) References Cited

U.S. PATENT DOCUMENTS

| | | |
|---|---|---|
| 3,791,110 A | 2/1974 | Klein et al. |
| 4,421,660 A | 12/1983 | Solc nee Hajna |

(Continued)

FOREIGN PATENT DOCUMENTS

| | | |
|---|---|---|
| EP | 0209879 | 1/1987 |
| EP | 0324986 A1 | 7/1989 |

(Continued)

OTHER PUBLICATIONS

Streletzky in Journal of Chemical Physics, vol. 116, No. 10, 2002, pp. 4058 to 4061.

(Continued)

*Primary Examiner* — Dana Ross
*Assistant Examiner* — Matthew G Katcoff
(74) *Attorney, Agent, or Firm* — Novak Druce Connolly Bove + Quigg LLP

(57) ABSTRACT

A method for producing nanoscale organic solid particles is proposed,
  starting from the corresponding sublimable organic solid as raw material,
  in the form of particles having an average particle diameter in the range of from 1 μm to 10 mm,
  which are dispersed in a carrier gas so as to obtain a dispersion,
  which is relaxed in a convergent nozzle, which is followed by an expansion chamber, and wherein
  openings are provided rotationally symmetrically about the midaxis of the expansion chamber in the wall of the expansion chamber which comprises the product outlet opening, through which openings a secondary gas flow is injected comprising an inert gas carrier and molecules, ions or nanoscale particles contained in molecularly disperse form therein, which are different from the raw material and which have an average particle diameter that is less than the average particle diameter of the product.

18 Claims, 1 Drawing Sheet

(56) References Cited

U.S. PATENT DOCUMENTS

| | | | |
|---|---|---|---|
| 4,874,409 | A | 10/1989 | Vitovec et al. |
| 5,178,736 | A | 1/1993 | Richardson |
| 5,203,975 | A | 4/1993 | Richardson |
| 5,338,434 | A | 8/1994 | Ruhl et al. |
| 6,951,312 | B2 * | 10/2005 | Casalmir et al. ............... 241/39 |
| 7,736,553 | B2 | 6/2010 | Halpap et al. |
| 2005/0129946 | A1 | 6/2005 | Hayashi |
| 2006/0175441 | A1 * | 8/2006 | Capelle, Jr. ..................... 241/5 |
| 2007/0023283 | A1 | 2/2007 | Huang |
| 2007/0051634 | A1 | 3/2007 | Poole |
| 2007/0262482 | A1 * | 11/2007 | Halpap et al. ................... 264/10 |

FOREIGN PATENT DOCUMENTS

| | | |
|---|---|---|
| EP | 0595341 | 5/1994 |
| WO | WO 03/006151 | 1/2003 |
| WO | WO-2006/005536 A1 | 1/2006 |

OTHER PUBLICATIONS

Sane et al., The Royal Society of Chemistry, 2003, 2720-2721.

U.S. Appl. No. 12/514,915, filed Jun. 24, 2009, Danner.

U.S. Appl. No. 12/366,963, filed Feb. 6, 2009, Mertler.

* cited by examiner

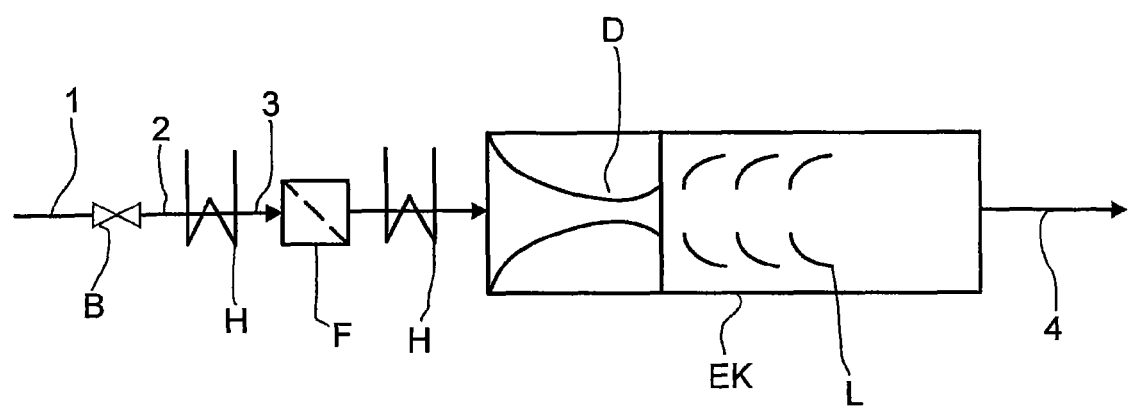

PROCESS FOR PRODUCING NANOSCALE ORGANIC SOLID PARTICLES

CROSS-REFERENCE TO RELATED APPLICATIONS

This application is a national stage application (under 35 U.S.C. §371) of PCT/EP2009/060354, filed Aug. 11, 2009, which claims benefit of European application 08162455.3, filed Aug. 15, 2008, the contents of each of which are incorporated herein by reference in their entireties.

FIELD OF THE INVENTION

The invention relates to a method for producing nanoscale organic solid particles though sublimation/desublimation by relaxation in a convergent nozzle.

BACKGROUND

The term nanoscale generally refers to solid particles whose average particle diameter lies in the submicron range, i.e. less than 1 µm, or is even less than 0.5 µm (500 nm). Owing to their dimensions, nanoparticles have properties which sometimes differ fundamentally from the properties of the same substance when it is in a less fine distribution.

Nanoscale organic solids can be produced by various methods, in particular by grinding, reactions in the gas phase, reactions in a flame, by crystallization, precipitation, sol-gel processes, or by sublimation/desublimation.

It is known to carry out the desublimation by rapid relaxation of an inert gas jet, containing the starting substance for production of the nanoscale organic solid particles in molecularly disperse form, in a convergent nozzle whose narrowest cross section is configured so that the inert gas flow containing the solid particles in molecularly disperse form is accelerated to a velocity of Mach 1 or more. These are preferably so-called Laval nozzles, a nozzle shape in which a convergent input part is followed by a divergent output part.

For instance Streletzky in Journal of Chemical Physics, Vol. 116, No. 10, 2002, pages 4058 to 4061, describes controlled nucleation and controlled growth of nanoscale drops in supersonic nozzles, the attempt having been made to separate the nucleation zone from the growth zone. Relaxation of the free jet from the nozzle into a special expansion chamber, and cooling of the latter, are not mentioned.

In his Habilitationsschrift (qualifying postdoctoral thesis) "Erzeugung von organischen Nanopartikeln mit überkritischen Fluiden ("Production of organic nanoparticles with supercritical fluids") at the TU Karlsruhe, 2001, pages 40 to 43 and 46 to 51, Michael Türk describes a method for producing organic nanoparticles by rapid expansion of supercritical solutions (RESS). Nozzles with diameters in the range of 50 μm are described, and the relaxation took place into an expansion chamber. The document contains no reference to influencing the reflux region in order to control the particle geometry.

Sane et al. in The Royal Society of Chemistry, 2003, 2720-2721, describe the production of porphyrin by the RESS method (Rapid Expansion of Supercritical Solutions). The RESS method utilizes the property of compressed gases that they dissolve substances. Carbon dioxide is mostly used for this. The nozzles used had a diameter of 50 μm and a diameter to length ratio of 1:4. The document gives no reference to an expansion chamber or influencing the reflux region.

The dissertation by Kodde (Hannover University, 1996) which is published in VDI-Fortschrittsberichte, series 3, No. 451, 1996, describes on pages 22 to 25, 84 and 85 studies of heterogeneous desublimation, a thermally conditioned gas mixture of air and succinic acid having been cooled by mixing with cold air in a tube flow. Owing to the cooling, the succinic acid desublimes on the submicronic particles contained in the cold air. In a continuation of this work by Wagner (cf. Chemie Ingenieur Technik, Vol. 71, 1999), the mixture of carrier gas and succinic acid vapor was mixed with the gas flow containing nuclei. The desublimation was then initiated by relaxation of the gas mixture in a nozzle with a subsequent capillary. Heterogeneous condensation took place on the nuclei already present. None of the works describes expansion into an expansion chamber and influencing the reflux region in the expansion chamber.

Nanoparticulate organic solids are used in various fields. It is often necessary to comply with predetermined particle sizes, particle size distributions or particle shapes. Usually, these cannot be achieved by the particles initially formed during the expansion process.

BRIEF SUMMARY

It was therefore an object of the invention to control the geometry of nanoscale organic solid particles which have been obtained by relaxation with acceleration to sonic or supersonic velocity, in particular the particle size, particle size distribution, particle shape and optionally the crystal structure, in order to meet predetermined specifications.

The solution consists in a method for producing nanoscale organic solid particles starting from the corresponding sublimable organic solid as raw material, in the form of particles having an average particle diameter in the range of from 1 μm to 10 mm, which are dispersed in a carrier gas so as to obtain a dispersion, containing the particles of the sublimable organic solid as a disperse phase in the carrier gas as a continuous phase, the solid particles of the dispersion being sublimed in molecularly disperse form by supplying heat at a temperature below the decomposition temperature, so as to obtain a carrier gas flow saturated or unsaturated with the raw material in molecularly disperse form, and the carrier gas flow containing the raw material in molecularly disperse form being delivered to a convergent nozzle whose narrowest cross section is configured so that the carrier gas flow containing the raw material is accelerated in the convergent nozzle to a velocity in the range of from Mach 1 to Mach 3 and is subsequently relaxed as a free jet through an outlet opening from the convergent nozzle into an elongated expansion chamber so as to obtain a supersaturated carrier gas flow from which the product, i.e. the nanoscale organic solid particles, desublimes, the expansion chamber being arranged rotationally symmetrically about the longitudinal axis of the convergent nozzle, in extension of the convergent nozzle, and being closed on all sides except for the outlet opening from the convergent nozzle at one end and a product outlet opening at the other end of the expansion chamber, and having a ratio of length L to diameter D of the expansion chamber in the range of from 5 to 20, a reflux region being formed between the free jet and the inner wall of the expansion chamber, in which the carrier gas flow is deflected in the opposite direction to the free jet and is sucked in again by the free jet, wherein openings are provided rotationally symmetrically about the midaxis of the expansion chamber in the wall of the expansion chamber which comprises the product outlet opening, through which openings a secondary gas flow is injected comprising a gas carrier and molecules, ions or nanoscale particles contained in molecularly disperse form therein, which are different to the raw material and which have an average particle diameter that is less than the average particle diameter of the product.

Preferably, the carrier gas is an inert gas.

BRIEF DESCRIPTION OF THE DRAWING

FIG. 1 is a schematic representation of a system for carrying out a preferred embodiment of the method according to the invention.

DETAILED DESCRIPTION OF THE PREFERRED EMBODIMENTS

The invention therefore provides a method according to which the product properties of the nanoscale organic solid particles obtained by desublimation, in particular the particle size, particle size distribution, particle shape and optionally the crystal structure, are controlled by influencing the reflux region which envelops the free jet emerging from the convergent nozzle with a velocity in the range of from Mach 1 to Mach 3 and is bounded by the inner wall of the expansion chamber.

To this end according to the invention a secondary gas flow is injected into the reflux region, which are different to the raw material and which have an average particle diameter that is less than the average particle diameter of the product.

The method according to the invention is based on the sublimable organic solid corresponding to the product as a raw material in the form of particles, having an average particle diameter in the range of from 1 µm to 10 mm.

It may preferably be based on particles of the raw material having an average particle diameter in the range of from 1 µm to 1 mm, or even from 1 µm to 10 µm.

In a first method step, the raw material is dispersed in an inert gas flow so as to obtain a dispersion of the particles of the raw material as a disperse phase in the inert gas as a continuous phase. With average particle diameters of less than 10 µm, the dispersion obtained is conventionally referred to as an aerosol.

The raw material is preferably dispersed in the inert gas under pressure, in particular at a pressure in the range of from 1.5 to 10 bar absolute, more preferably at a pressure in the range of from 1.5 to 3 bar absolute.

The inert gas into which the raw material is dispersed, as well as the inert gas carrier for the secondary gas flow, is preferably nitrogen.

In a next method step, the dispersion or the aerosol is sublimed in molecularly disperse form by supplying heat at a temperature below the decomposition temperature of the raw material. Preferably, it is heated to a temperature in the range of from 300 to 800° C. An inert gas flow saturated or unsaturated with the raw material in molecularly disperse form is thereby obtained.

Non-sublimable solid impurities, which were introduced together with the raw material into the inert gas flow, are preferably removed from it in a separator, preferably a hot gas filter, a cyclone or an electrofilter.

The inert gas flow containing the raw material in molecularly disperse form, from which non-sublimed solid impurities have optionally been removed, may preferably be delivered to a mixing chamber in which the flow is rendered uniform by a cross-sectional expansion. The mixing chamber is preferably arranged vertically.

The inert gas optionally homogenized in a mixing chamber, with solid particles contained therein in molecularly disperse form, is subsequently delivered to a convergent nozzle whose narrowest cross section is configured so that the inert gas flow containing the raw material in molecularly disperse form is accelerated to a velocity in the range of from Mach 1 to Mach 3. The hot inert gas flow is thereby suddenly relaxed and thus strongly cooled, very high supersaturation being generated. Because this process is extremely short, it may approximately be regarded as adiabatic.

The convergent nozzle may preferably be followed by a further, divergent nozzle part so that the nozzle may overall be considered as a Laval nozzle, i.e. a nozzle shape comprising a convergent part in the inlet region and a divergent part in the outlet region, which are connected together in the region of the narrowest cross section, and which is configured so that acceleration of the gas flow takes place to a velocity in the range of from Mach 1 to Mach 3.

As is known, the Mach number is a physical and dimensionless parameter of velocity. It indicates the ratio of inertial forces to compression forces and reduces to the ratio of the magnitude of a velocity V, for example of a body or a fluid, to the velocity of sound c in the surrounding fluid (cf. Mach number in Wikipedia).

The convergent nozzle, or preferably the Laval nozzle, opens through an outlet opening as a free jet into an elongated expansion chamber whose ratio of length L to diameter D is configured in the range of from 5 to 20.

In the convergent or Laval nozzle and the expansion chamber connected to it, desublimation takes place owing to the cooling and the concomitant supersaturation. The degree of supersaturation depends in particular on the mass concentration of the raw material in molecularly disperse form in the inert gas before the convergent or convergent-divergent nozzle (Laval nozzle) as well as on the specific vapor pressure curve of the raw material. Particularly for high molecular weight substances, the particle formation is shifted in the direction of the expansion chamber owing to the low vapor pressure. The residence time in the expansion chamber, i.e. in the free jet and in the reflux region, therefore gains essential importance for the particle reformation and the particle growth. Particle properties, in particular size, size distribution, shape and optionally crystal structure, can be controlled by influencing the residence time. By the method according to the invention, in particular the residence time in the expansion chamber is lengthened and/or the particle formation is stimulated by introducing a secondary gas flow having molecules, ions or nanoscale particles contained in molecularly disperse form therein, which are different to the raw material, and the particle properties are thereby controlled.

The term free jet refers to a jet which flows out from a nozzle into the free environment without a wall boundary. The fluid flowing out from the nozzle and the fluid in the environment have different velocities. The fluid surrounding the free jet is sucked in and entrained.

On the other hand, the term reflux region here refers to the region enveloping the free jet between the free jet and the inner wall of the expansion chamber, in which the inert gas flow is deflected in the opposite direction to the expanding free jet and is sucked in again by the free jet. The flow velocity in the reflux region is much less than in the free jet. Theoretical approaches for describing reflux flows are based on the extended Prandtl boundary layer theory.

Owing to the fact that according to the invention a secondary gas flow is injected comprising an inert gas carrier and molecules, ions or nanoscale particles contained in molecularly disperse form therein, which are different to the raw material, heterogeneous desublimation is initiated by these so-called seeding particles or nucleation agents.

According to the invention, the secondary gas flow is introduced through openings which are arranged rotationally symmetrically about the midaxis of the expansion chamber in the wall of the expansion chamber which comprises the product outlet opening, and which lies opposite the outlet opening from the convergent nozzle or the convergent-divergent nozzle.

The openings, arranged rotationally symmetrically about the midaxis of the expansion chamber, may also be connected together to form an annular gap.

In order to control the residence time for the nucleation and the particle growth, the ratio of the diameter of the outlet opening from the convergent nozzle or the Laval nozzle, d, to the diameter of the expansion chamber, D, is advantageously configured in the range of from 5 to 100. By means of the ratio of the diameter of the outlet opening from the convergent nozzle or the Laval nozzle, d, to the diameter of the expansion chamber, D, the nucleation and the particle growth of the product obtained by desublimation are controlled.

The reflux region may advantageously also be influenced by cooling the wall of the expansion chamber.

In one embodiment, the cooling may be carried out by a means of double casing through which a coolant flows.

In addition cooling fins, which extend from the wall of the expansion chamber into the interior of the expansion chamber, may also be provided for the cooling.

In another embodiment, an additional secondary gas flow may be injected or sucked in through two or more openings on the casing of the expansion chamber, which are preferably arranged symmetrically. The secondary gas flow, which is introduced through the two or more openings on the casing of the expansion chamber, comprises an inert gas carrier and molecules, ions or nanoscale particles contained in molecularly disperse form therein, which are different to the raw material and which have an average particle diameter that is less than the average particle diameter of the product.

In addition or as an alternative to two or more openings on the casing of the expansion chamber, two or more openings may be provided in the wall of the expansion chamber which comprises the outlet opening from the convergent nozzle, in order to deliver a secondary gas flow comprising an inert gas carrier and molecules, ions or nanoscale particles contained in molecularly disperse form therein, which are different to the raw material and which have an average particle diameter that is less than the average particle diameter of the product.

In another embodiment guide vanes, which are preferably cooled, may additionally or alternatively be provided in the reflux region in the expansion chamber.

Advantageously, an electrical voltage may be applied between the guide vanes arranged in the reflux region and the inner wall of the expansion chamber.

A preferred application field of the particles produced by the method according to the invention is organic semiconductors, for example optical displays, solar cells or gas detectors. This is because for optical displays and semiconductor components such as OLEDs and OFEDs, small particle sizes and narrow particle size distributions are of fundamental importance for the product properties. For example, phthalocyanines are used for such semiconductor components.

Another preferred application field is conductor track printing. For special application tasks, for example electronic newspapers or thermoelectrical flow sensors, extremely thin-film conductor tracks are required. These can be applied onto a circuit board by special printing methods. To this end, however, the particles contained in the ink suspension must meet special requirements in respect of size and shape, usually a very narrowly distributed disperse phase and optionally a special crystalline phase. For example, the beta phase of copper phthalocyanine is thermally very stable and has good semiconductor properties.

Other preferred application fields for the method according to the invention are organic nanopigments for paints, for example the COL.9® nanobinder from BASF SE, paints with a lotus effect, optical functional layers, catalytic converters, self-cleaning surfaces, transparent scratchproof coatings, cosmetics and biocompatible surfaces.

The invention will be explained in more detail below with the aid of a drawing.

The single FIG. 1 shows the schematic representation of a system for carrying out a preferred embodiment of the method according to the invention.

A feed flow 1, comprising an inert gas as well as sublimable organic solid particles as raw material, is fed through a brush doser B, the sublimable organic solid particles being dispersed in the inert gas. The dispersion 2 thereby obtained is heated in a heating oven H to a temperature at which the organic solid particles of the raw material sublime, but which is lower than their decomposition temperature. An inert gas flow 3 saturated or unsaturated with the raw material in molecularly disperse form is thus obtained, which may also contain non-sublimable solid particles from the flow 1. In order to remove these, for example, the flow 3 is fed through a hot gas filter F. The filtered flow may be delivered through a further heater H for thermal conditioning and subsequently to a preferably convergent-divergent nozzle D. The outlet opening of the nozzle D is followed by an expansion chamber EK, which may have cooled walls (an embodiment without wall cooling is represented in the FIGURE) and which may have guide vanes L in a preferred embodiment. The product gas flow containing the nanoscale organic solid particles, i.e. flow 4, is drawn off from the outlet opening of the expansion chamber EK at the opposite end relative to the outlet opening from the convergent/divergent nozzle into the expansion chamber.

The invention claimed is:

1. A method for producing nanoscale organic solid particles starting from the corresponding sublimable organic solid as raw material, in the form of particles having an average particle diameter in the range of from 1 μm to 10 mm, which are dispersed in a carrier gas so as to obtain a dispersion, containing the particles of the sublimable organic solid as a disperse phase in the carrier gas as a continuous phase, the solid particles of the dispersion being sublimed in molecularly disperse form by supplying heat at a temperature below the decomposition temperature, so as to obtain a carrier gas flow saturated or unsaturated with the raw material in molecularly disperse form, and the carrier gas flow containing the raw material in molecularly disperse form being delivered to a convergent nozzle whose narrowest cross section is configured so that the carrier gas flow containing the raw material is accelerated in the convergent nozzle to a velocity in the range of from Mach 1 to Mach 3 and is subsequently relaxed as a free jet through an outlet opening from the convergent nozzle into an elongated expansion chamber so as to obtain a supersaturated carrier gas flow from which the product, i.e. the nanoscale organic solid particles, desublimes, the expansion chamber being arranged rotationally symmetrically about the longitudinal axis of the convergent nozzle, in extension of the convergent nozzle, and being closed on all sides except for the outlet opening from the convergent nozzle at one end and a product outlet opening at the other end of the expansion chamber, and having a ratio of length L to diameter D in the range of from 5 to 20, a reflux region being formed between the free jet and the inner wall of the expansion chamber, in which the carrier gas flow is deflected in the opposite direction to the free jet and is sucked in again by the free jet, wherein openings are provided rotationally symmetrically about the midaxis of the expansion chamber in the wall of the expansion chamber which comprises the product outlet opening, through which openings a secondary gas flow is injected comprising a gas carrier and molecules, ions or nanoscale particles contained in molecularly disperse form therein, which are different from the raw material and which have an average particle diameter that is less than the average particle diameter of the product.

2. The method as claimed in claim 1, wherein the raw material is used in the form of particles having an average particle diameter in the range of from 1 μm to 1 mm.

3. The method as claimed in claim 1, wherein the convergent nozzle is designed in the form of a Laval nozzle, in which a convergent first region of the nozzle is followed by a divergent second region.

4. The method as claimed in claim 1, wherein the openings provided rotationally symmetrically about the midaxis of the expansion chamber are connected together to form an annular gap.

5. The method as claimed in claim 1, wherein the carrier gas in which the raw material is dispersed, as well as the gas carrier for the secondary gas flow, is an inert gas.

6. The method as claimed in claim 1, wherein the raw material is dispersed in the inert gas at a pressure in the range of from 1.5 to 10 bar absolute.

7. The method as claimed in claim 1, wherein non-sublimable solid impurities, which were introduced together with the raw material, are removed from the inert gas flow containing the raw material in molecularly disperse form in a separator.

8. The method as claimed in claim 1, having a ratio of the diameter of the outlet opening from the convergent nozzle, d, to the diameter of the expansion chamber, D, in the range of from 5 to 100.

9. The method as claimed in claim 1, wherein the wall of the expansion chamber is cooled.

10. The method as claimed in claim 9, wherein the cooling is carried out by means of a double casing through which a coolant flows.

11. The method as claimed in claim 9, wherein the cooling is carried out by means of cooling fins, which extend from the wall of the expansion chamber into the interior of the expansion chamber.

12. The method as claimed in claim 1, wherein two or more openings are provided, preferably symmetrically, on the casing of the expansion chamber, through which openings a secondary gas flow is injected or sucked comprising an inert gas carrier and molecules, ions or nanoscale particles contained in molecularly disperse form therein, which are different from the raw material and which have an average particle diameter that is less than the average particle diameter of the product.

13. The method as claimed in claim 1, wherein two or more openings are provided in the wall of the expansion chamber which comprises the outlet opening from the convergent nozzle, in order to deliver a secondary gas flow comprising an inert gas carrier and molecules, ions or nanoscale particles contained in molecularly disperse form therein, which are different from the raw material and which have an average particle diameter that is less than the average particle diameter of the product.

14. The method as claimed in claim 1, wherein guide vanes, which are preferably cooled, are provided in the reflux region in the expansion chamber.

15. The method as claimed in claim 14, wherein an electrical voltage is applied between the guide vanes arranged in the reflux region and the inner wall of the expansion chamber.

16. The method as claimed in claim 5, wherein the carrier gas in which the raw material is dispersed, as well as the gas carrier for the secondary gas flow, is an inert gas.

17. The method as claimed in claim 6, wherein the raw material is dispersed in the inert gas at a pressure in the range of from 1.5 to 10 bar absolute.

18. The method as claimed in claim 7, wherein non-sublimable solid impurities, which were introduced together with the raw material, are removed from the inert gas flow containing the raw material in molecularly disperse form in a separator a hot gas filter, a cyclone or an electrofilter.

* * * * *

UNITED STATES PATENT AND TRADEMARK OFFICE
CERTIFICATE OF CORRECTION

PATENT NO.        : 8,573,519 B2                                              Page 1 of 1
APPLICATION NO. : 13/059046
DATED             : November 5, 2013
INVENTOR(S)       : Mertler et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 450 days.

Signed and Sealed this
Twenty-second Day of September, 2015

Michelle K. Lee
*Director of the United States Patent and Trademark Office*